(12) United States Patent
Kohlstruk et al.

(10) Patent No.: US 6,730,628 B2
(45) Date of Patent: May 4, 2004

(54) CATALYST AND PROCESS FOR PREPARING COLOR-REDUCED POLYISOCYANATES CONTAINING ISOCYANURATE GROUPS

(75) Inventors: Stephan Kohlstruk, Marl (DE); Lutz Mindach, Marl (DE); Michael Ewald, Marl (DE)

(73) Assignee: Degussa AG, Dusseldorf (DE)

( * ) Notice: Subject to any disclaimer, the term of this patent is extended or adjusted under 35 U.S.C. 154(b) by 0 days.

(21) Appl. No.: 10/357,351

(22) Filed: Feb. 4, 2003

(65) Prior Publication Data

US 2003/0153714 A1 Aug. 14, 2003

Related U.S. Application Data

(62) Division of application No. 09/663,927, filed on Sep. 18, 2000, now Pat. No. 6,552,154.

(30) Foreign Application Priority Data

Sep. 16, 1999 (DE) .......................................... 199 44 373

(51) Int. Cl.[7] .......................... B01J 31/00; C08G 18/00; C08G 18/77; C08J 9/00
(52) U.S. Cl. .......................... 502/164; 528/52; 528/73; 521/118
(58) Field of Search .......................... 502/164; 528/52, 528/73; 521/118

(56) References Cited

U.S. PATENT DOCUMENTS

| 3,892,687 A | 7/1975 | Bechara et al. .............. 521/118 |
| 3,993,652 A | 11/1976 | Bechara et al. .............. 544/351 |
| 4,040,992 A | 8/1977 | Bechara et al. .............. 521/117 |
| 4,116,879 A | 9/1978 | Bechara et al. .............. 502/164 |
| 4,596,678 A | 6/1986 | Merger et al. |
| 4,596,679 A | 6/1986 | Hellbach et al. |
| 4,851,531 A | 7/1989 | Halpaap et al. .............. 544/222 |
| 5,087,739 A | 2/1992 | Bohmholdt et al. |
| 5,290,902 A | 3/1994 | Jacobs et al. |
| 5,489,663 A | 2/1996 | Brandt et al. .................. 528/52 |
| 6,093,817 A | 7/2000 | Kohlstruk et al. |
| 6,452,003 B1 | 9/2002 | Ewald et al. |

FOREIGN PATENT DOCUMENTS

| DE | 26 31 733 | 2/1977 |
| DE | 3902078 A1 | 7/1990 |
| EP | 0 082 987 A2 | 12/1982 |
| EP | 0 126 299 A1 | 4/1984 |
| EP | 0 126 300 A1 | 4/1984 |
| EP | 0 182 203 | 5/1986 |
| EP | 0 224 165 A2 | 11/1986 |
| EP | 0 339 396 A1 | 4/1989 |
| EP | 0 351 873 A2 | 7/1989 |
| EP | 0 355 443 A2 | 7/1989 |
| GB | 1 391066 | 7/1971 |

OTHER PUBLICATIONS

U.S. patent application Ser. No. 10/023,901, Kohlstruk et al., filed Dec. 21, 2001.
U.S. patent application Ser. No. 10/180,016, Kohlstruk et al., filed Jun. 27, 2002.
U.S. patent application Ser. No. 10/304,945, Ewald et al., filed Nov. 27, 2002.
U.S. patent application Ser. No. 10/357,448, Kohlstruk et al., filed Feb. 4, 2003.
U.S. patent application Ser. No. 10/357,351, Kohlstruk et al., filed Feb. 4, 2003.
U.S. patent application Ser. No. 10/307,923, Ewald et al., filed Dec. 3, 2002.

*Primary Examiner*—Ceila Chang
*Assistant Examiner*—Taylor V. Oh
(74) *Attorney, Agent, or Firm*—Oblon, Spivak, McClelland, Maier & Neustadt, P.C.

(57) ABSTRACT

The present invention relates to a catalyst and to a process for preparing color-reduced polyisocyanates containing isocyanurate groups.

15 Claims, No Drawings

CATALYST AND PROCESS FOR PREPARING COLOR-REDUCED POLYISOCYANATES CONTAINING ISOCYANURATE GROUPS

BACKGROUND OF THE INVENTION

1. Field of the Invention

The present invention relates to a catalyst and to a process for preparing color-reduced polyisocyanates containing isocyanurate groups.

2. Discussion of the Background

For high-quality one- and two-component polyurethane coating materials possessing good light and weathering stability, polyisocyanate mixtures containing isocyanurate groups and uretdione groups are typically used as the isocyanate component.

For the preparation of polyisocyanates containing isocyanurate groups and uretdione groups, which are suitable as raw materials or polyurethane coating formulations, a variety of processes are known. These processes typically differ in the selection of the trimerization catalysts or in the selection of the organic isocyanates to be used in the oligomerization reaction (cf., e.g., GB 1 391 066, EP-A-0 082 987, DE-A 39 02 078, EP-A-0 339 396, EP-A-0 224 165).

Suitable isocyanates used for trimerization, examples of which include aromatic, cycloaliphatic and aliphatic polyisocyanates having a functionality of two or more, can be prepared by various kinds of processes (Annalen der Chemie 562 (1949) pages 75 ff.). Those which have proven particularly suitable in industry include preparation by phosgenation of organic polyamines to the corresponding polycarbamoyl chlorides and the thermal cleavage of the chlorides into organic polyisocyanates and hydrogen chloride. Alternatively, organic polyisocyanates can be prepared without the use of phosgene, i.e., by phosgene-free processes. According to EP-A-0 126 299 (U.S. Pat. No. 4,596,678), EP-A-126 300 (U.S. Pat. No. 4,596,679) and EP-A-355 443 (U.S. Pat. No. 5,087,739), for example, (cyclo)aliphatic diisocyanates—such as 1,6-hexa-methylenediisocyanate (HDI) and/or isomeric aliphatic diisocyanates having 6 carbon atoms in the alkylene radical, and 1-isocyanato-3-isocyanatomethyl-3,5,5-trimethylcyclohexane (isophorone diisocyanate or IPDI)—can be prepared by reacting (cyclo) aliphatic diamines with urea and alcohols to give (cyclo) aliphatic biscarbamic esters and thermally cleaving these esters into the corresponding diisocyanates and alcohols. The synthesis takes place continuously in a circulation process and in the presence, if desired, of N-unsubstituted carbamic esters, dialkyl carbonates, and other byproducts returned from the reaction process.

Examples of catalysts which can be used for the trimerization of isocyanates to give the desired polyisocyanates containing isocyanurate groups and uretdione groups include tertiary amines, phosphines, alkali metal phenoxides, aminosilanes, quaternary ammonium hydroxides, and quaternary ammonium carbonates. Highly suitable oligomerization catalysts are hydroxides, halides or carboxylates of hydroxyalkylammonium ions (cf., e.g. EP-A-0 351 873, U.S. Pat. No. 5,290,902), alkali metal salts, and tin salts, zinc salts and lead salts of alkylcarboxylic acids. Depending on the catalyst, it is also possible to use various cocatalysts such as, for example, OH-functionalized compounds or Mannich bases comprising secondary amines and aldehydes and/or ketones.

For the oligomerization, the (cyclo)aliphatic diisocyanates are reacted in the presence of the catalyst, with or without the use as solvents and/or auxiliaries, until the desired conversion is attained. Partial trimerization is one of the terms used in this context, since the target conversion is generally well below 100%. Subsequently, the reaction is terminated by deactivating the catalyst and the excess monomeric diisocyanate is usually separated off, generally by flash distillation or thin-film distillation. Deactivation is carried out thermally or by adding a catalyst inhibitor such as, for example, p-toluenesulfonic acid or bis(2-ethylhexyl) phosphate. Particularly advantageous in the context of the trimerization of isocycanates on the industrial scale is the use of quaternary hydroxyalkylammonium carboxylates as oligomerization catalysts. These catalysts of the choline type are thermally unstable. It is unnecessary to terminate the trimerization on reaching the desired conversion by adding catalyst inhibitors which have the potential to reduce the quality. Instead, the controlled thermal deactivation permits optimum process control. The thermal instability is also advantageous from the standpoint of process safety. Uncontrolled "runaway" of the reaction is impossible, provided the amount of catalyst metered in remains below a multiple of the usual amount.

Depending on the type of catalyst used and the reaction temperature, the resulting polyisocyanates have different proportions of isocyanurate groups and/or uretdione groups. The products are usually clear, although products with a more or less strong yellow coloration may also be obtained depending on the type of catalyst, quality of disocyanate, temperature of reaction and reaction regime. For the preparation of high-quality polyurethane coating materials, however, products having a very low color number are desired.

The unwanted yellow also occurs when the otherwise highly advantageous quaternary hydroxyalkylammonium carboxylates are used (vide supra), so that there is a specific requirement for improvement in this context. Surprisingly, it has now been found that, in comparison to other catalysts of this type, specific quaternary hydroxyalkylammonium carboxylates provide polyisocyanates, which contain isocyanurate groups, having-markedly improved color quality.

SUMMARY OF THE INVENTION

It is an object of the present invention to provide a process for preparing polyisocyates that avoids the problems described above.

This and other objects of the invention have been achieved by the present invention, the first embodiment of which provides a process for preparing color-reduced polyisocyanates containing isocyanurate groups, which process includes:

trimerizing at least one diisocyanate in the presence of 0.04–2% by weight, based on the weight of the diisocyanate, at least one trimerization catalyst of the formula (I):

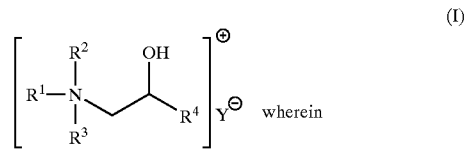

wherein

-continued $R^1 =$ 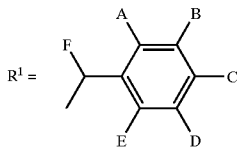

and wherein:

A, B, C, D and E independently of one another or simultaneously are hydrogen, chloro, C1–C4 alkyl, C1–C4 alkoxy, C1–C4 alkoxycarbonyl, hydroxyl, $(R^5)_3SiO—$, $(R^5)_2 N—$, COOH, $(R^5)_2N—CH_2—$ or phenyl, it being possible for any two adjacent A, B, C, D and E radicals to form a conjoint 5- or 6-membered saturated or unsaturated ring which may optionally and additionally include N, S or O as heteroatom;

F is hydrogen or methyl;

$R^2$ and $R^3$ independently of one another or simultaneously are C1–C4 alkyl, C2–C6 hydroxyalkyl with the hydroxyl group in position 2 relative to the quaternary nitrogen or $R^1$;

$R^4$ is hydrogen, methyl, C2–C10 alkyl, C3–C8 cycloalkyl or C2–C12 alkoxy;

$R^5$ is C1–C4 alkyl;

$Y^-$ is $R^6COO^-$ or $OH^-$; and $R^6$ is hydrogen or a branched or unbranched, aliphatic or araliphatic, C1–C10 alkyl radical.

Another embodiment of the invention provides a trimerization catalyst of the formula (I):

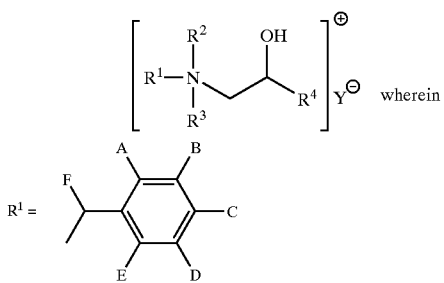 wherein (I)

and where the variables are defined as follows:

A, B, C, D and E independently of one another or simultaneously are hydrogen, chloro, C1–C4 alkyl, C1–C4 alkoxy, C1–C4 alkoxycarbonyl, hydroxyl, $(R^5)_3SiO—$, $(R^5)_2 N—$, $—COOH$, $(R^5)_2N—CH_2—$ or phenyl, it being possible for any two adjacent A, B, C, D and E radicals to form a conjoint 5- or 6-membered saturated or unsaturated ring which may optionally and additionally include N, S or O as heteroatom;

F is hydrogen or methyl;

$R^2$ and $R^3$ independently of one another or simultaneously are C1–C4 alkyl, C2–C6 hydroxyalkyl with a hydroxyl group in position 2 relative to the quaternary nitrogen in formula (I), or $R^1$;

$R^4$ is hydrogen, methyl, C2–C10 alkyl, C3–C8 cycloalkyl or C2–C12 alkoxy;

$R^5$ is C1–C4 alkyl;

$Y^-$ is $R^6COO^-$ or $OH^-$; and $R^6$ is hydrogen or a branched or unbranched, aliphatic or araliphatic, C1–C10 alkyl radical.

DETAILED DESCRIPTION OF THE INVENTION

Various other objects, features and attendant advantages of the present invention will be more fully appreciated as the same becomes better understood from the following detailed description of the preferred embodiments of the invention.

Preferably, the invention provides a process for preparing color-reduced polyisocyanates containing isocyanurate groups by partially trimerizing aliphatic, cycloaliphatic and/or (cyclo)aliphatic diisocyanates and subsequently separating off excess diisocyanate, which includes performing the trimerization in the presence of 0.04–2% by weight, based on the weight of the diisocyanate used, of at least one trimerization catalyst of the general formula (I)

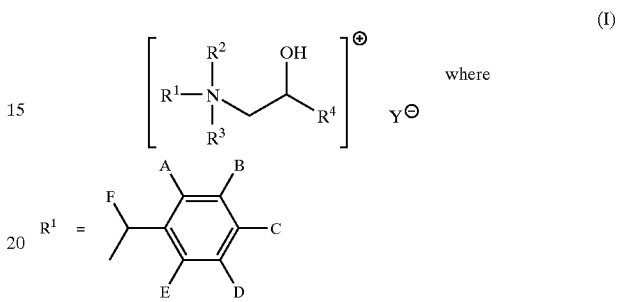 where (I)

and where the variables are defined as follows:

A, B, C, D and E independently of one another or simultaneously are hydrogen, chloro, C1–C4 alkyl, C1–C4 alkoxy, C1–C4 alkoxycarbonyl, hydroxyl, $(R^5)_3SiO—$, $(R^5)_2 N—$, $—COOH$, $(R^5)_2N—CH_2—$ or phenyl, it being possible for any two adjacent radicals from the group A, B, C, D and E to form a conjoint 5- or 6-membered saturated or unsaturated ring which may also include N, S or O as heteroatom;

F is hydrogen or methyl;

$R^2$ and $R^3$ independently of one another or simultaneously are C1–C4 alkyl, C2–C6 hydroxyalkyl (with the hydroxyl group in position 2 relative to the quaternary nitrogen) or $R^1$;

$R^4$ is hydrogen, methyl, C2–C10 alkyl, C3–C8 cycloalkyl or C2–C12 alkoxy;

R5 is C1–C4 alkyl;

$Y^-$ is $R^6COO^-$ or $OH^-$; and $R^6$ is hydrogen or a branched or unbranched aliphatic or araliphatic C1–C10 alkyl radical.

The invention further preferably provides a trimerization catalyst for preparing color-reduced polyisocyanates containing isocyanurate groups, of the general formula (I)

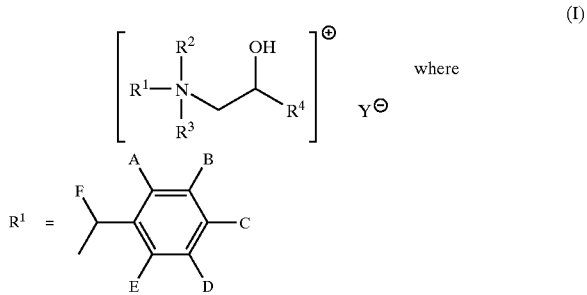 where (I)

and where the variables are defined as follows:

A, B, C, D and E independently of one another or simultaneously are hydrogen, chloro, C1–C4 alkyl, C1–C4 alkoxy, C1–C4 alkoxycarbonyl, hydroxyl, $(R^5)_3SiO—$, $(R^5)_2 N—$, $—COOH$, $(R^5)_2N—CH_2—$ or phenyl, it being possible for any two adjacent radicals from the group A, B, C, D and E to form a conjoint 5- or 6-membered saturated or unsaturated ring which may also include N, S or O as heteroatom;

F is hydrogen or methyl;

$R^2$ and $R^3$ independently of one another or simultaneously are C1–C4 alkyl, C2–C6 hydroxyalkyl (with the hydroxyl group in position 2 relative to the quaternary nitrogen) or $R^1$;

$R^4$ is hydrogen, methyl, C2–C10 alkyl, C3–C8 cycloalkyl or C2–C12 alkoxy;

$R^5$ is C1–C4 alkyl;

$Y^-$ is $R^6COO$ or $OH^-$; and $R^6$ is hydrogen or a branched or unbranched aliphatic or araliphatic C1–C10 alkyl radical.

The trimerization catalysts of the invention can be used to react diisocyanates prepared by the phosgene process or by a phosgene-free process: for example, by thermal cleavage of (cyclo)aliphatic biscarbamic esters (cf., e.g., EP-A-0 126 299 (U.S. Pat. No. 4,596,678)). Preferable suitable starting diisocyanates for the process of the invention include aliphatic, cycloaliphatic and/or (cyclo)aliphatic diisocyanates, more preferable examples being 1,4-diisocyanato-cyclohexane, 1,6-diisocyanatohexane (HDI), 1,12-diisocyanatododecane, 1-isocyanato-3,3,5-trimethylcyclo-hexane (IPDI), 4,4'-diisocyanatodicyclohexylmethane, 1,5-diisocyanato-2,2-dimethylpentane, 1,5-diisocyanato-2-ethyl-2-propylpentane, 1,5-diisocyanato-2-butyl-2-ethylpentane, 1,6-diisocyanato-2,4,4-trimethylhexane and 1,6-diisocyanato-2,4,4-trimethylhexane (TMDI), 1,5-diisocyanato-2-methylpentane (MPDI), and 2,5(2,6)-bis(isocyanatomethyl)bicyclo{2.2.1}heptane (NBDI). Even more preference is given to the use of HDI, IPDI, MPDI, TMDI and NBDI. Mixtures of diisocyanates are possible.

The preparation of the polyisocyanates containing isocyanurate groups by partial trimerization can take place either continuously (pipe reactor or reactor cascade) or batchwise. The catalysts of the invention are preferably used in a low concentration of between 0.04 and 2.0% by weight. The exact amount depends on the individual catalyst, on the target conversion and on the procedure, the use of stirred reactors having been found from experience to necessitate the metered addition of a larger amount of catalyst.

Under these conditions the trimerization can be carried out within 1–60 minutes. The resulting compounds have one or more isocyanurate rings. Compounds with a uretdione structure may also be found as a secondary component in small amounts. Compounds of this kind have been described in the literature.

The trimerization catalysts of the invention can be prepared by preferably reacting tertiary amines with a carboxylic acid and an oxirane. The molar ratio, with respect of the functionalities of the reactants, should be approximately 1:1:1; an excess of 20 mol % being with no significantly deleterious effect on catalyst performance, irrespective of the choice of the excess components. The reaction temperature is preferably between 10° C. and 80° C., more preferably between 20° C. and 50° C. The reaction can be conducted in the presence or absence of solvents. Examples of preferred solvents are ethylene glycol, tetrahydrofuran, 1-butanol, methanol, and benzyl alcohol.

Preferable examples of tertiary amines suitable in principle are N,N-dimethyl-2-methoxybenzylamine, N,N-dimethyl-3-methoxybenzylamine, N,N-dimethyl-4-methoxy-benzylamine, N,N-dimethyl-2,3-dimethoxybenzylaniine, N,N-dimethyl-3-4-dimetboxybenzylaxnine, N,N-dimethyl-3,5-dimethoxybenzylamine, N,N-dimethylbenzylamine, N,N-di-ethylbenzylaniine-4-carboxylic acid, 4-rnethoxycarbonyl-N,N-dimethylbenzylamine, 4-ethoxycarbonyl-N,N-diinethylbenzylamine, 3-(N,N-diethylaminomethyl)-N,N dimzthylcnzylamine dimethylbenzylaxnine, 2-phenylethyldimethylamine, 1-phenylethyldiethylamine, 4-hydroxy-N,N-dimethylbenzylamine, 4-trimethylsiloxy-N,N-dimetbylbenzylaniine and N,N-dimethylnaphthvlamine.

Preferable examples of suitable carboxylic acids are pivalic acid, hexanoic acid, acetic acid, 2-ethylhexanoic acid, propanoic acid, adipic acid, succinic acid and oleic acid.

Preferable oxiranes are aliphatic or araliphatic compounds having 1,2-epoxide groups; that is, for example, ethylene oxide, propylene oxide, 1,2-butylene oxide, 1,2-dodecene oxide, and 2,2-dimethyloxirane. The oxiranes can also be functionalized epoxy compounds such as, for example, 2,3-epoxypropyl isopropyl ether.

In order to prepare polyisocyanates containing isocyanurate groups, the catalysts of the invention are used preferably in small amounts. The exact amount can readily be determined by experiment and depends on the catalytic activity of the individual catalyst, on the target conversion and on the procedure.

In accordance with the invention, the hydroxyalkylammonium carboxylates of the formula I are preferably used in an amount of 0.04–2% by weight, more preferably 0.06–1.5% by weight, and even more preferably between 0.08 and 1.4% by weight based on the weight of the (cyclo)aliphatic diisocyanate used.

The process of the invention is preferably conducted at temperatures of between 35° C. and 185° C. Below 35° C., the amount of catalyst required for the trimerization has been found from experience to be so great that color problems may result. At temperatures above 185° C., there may likewise be unwanted discoloration of the polyisocyanates containing isocyanurate groups. Trimerization preferably takes place in the presence of the catalysts of the invention at temperatures between 50° C. and 175° C.

In accordance with the invention, the trimerization of the diisocyanates is carried out either batchwise or continuously.

In the case of the batch process, a stirred reactor is preferably used. In this case, the mixture of diisocyanate and catalyst are charged to the reactor usually at room temperature. Subsequently, the temperature of the reaction mixture is raised to 35–140° C., and preferably to 50–110° C., in order to initiate the trimerization. Alternatively, the catalyst can be metered in after the diisocyanate has reached the necessary temperature for the reaction. The trimerization is exothermic, and the catalyst is destroyed in the course of the reaction.

Continuous trimerization is preferably conducted in a reaction coil with continuous, simultaneous metered addition of the diisocyanate and of the trimerization catalyst at from 40 to 120° C. over a period of from 1 to 7 minutes. In a reaction pipe with a small diameter, high flow rates are achieved. Furthermore, it is very advantageous to heat the diusocyanate/catalyst mixture to about 50 to 60° C. before entry into the reaction pipe. An especially important factor is the metered addition of the catalyst. It is particularly preferable to mix the starting materials thoroughly prior to entry into the reaction coil. For more precise metering with small amounts of catalyst, and in order to generate a better quality of thorough mixing, it can be advantageous to dissolve the catalyst in an appropriate organic solvent. Appropriate solvents are in principle those in which the catalyst is readily soluble. Preferably, however, the use of solvents is very largely dispensed with.

The temperature of the sections of the reaction coil is judiciously chosen such that the preheat zone is at about 40 to 60° C., the reaction zone at from 70 to 120° C., preferably from 70 to 100° C., and the cooling zone at from 20 to 40° C. The optimum temperature conditions must in each case be adapted to the required conditions for the diisocyanate to be trimerized.

In order to remove unreacted diisocyanate, the reaction mixture is subjected to flash evaporation or short path distillation.

Preferable starting compounds appropriate for the trimerization are diisocyanates having aliphatic, cycloaliphatic or aliphatic and cycloaliphatic isocyanate groups which have been prepared by the phosgene process or by a phosgene-free process, or else mixtures of such diisocyanates. Suitable aliphatic diisocyanates have preferably 3 to 16, with particular preference 4 to 12, carbon atoms in their linear or branched alkylene substructure. Suitable low-chlorine cycloaliphatic diisocyanates have preferably 4 to 18, with particular preference 6 to 15, carbon atoms in their cycloalkylene substructure. Specific examples that may be mentioned include 1-isocyanato-3,3,5-trimethyl-5-isocyanatomethylcyclohexane (IPDI), 1,6-hexamethylene diisocyanate (HDI), 2-methyl-1,5-pentamethylene diisocyanate (MPDI), 2,5(2,6)-bis(isocyanatomethyl)bicyclo{2.2.1}heptane (NBDI), and 2,2,4- or 2,4,4-trimethyl-1,6-hexamethylene diisocyanate (TMDI).

The monomer-freed isocyanurates containing isocyanurate groups and prepared in accordance with the invention represent useful intermediates for polyurethane coatings, such as leather coatings and textile coatings, and for polyurethane dispersions and adhesives, and are particularly valuable as polyisocyanate components in 1- and 2-component polyurethane systems for weather- and light-stable polyurethane coating materials. In these applications, the process products of the invention can be used either as such or else in a form in which they are blocked with blocking agents. Examples of suitable blocking agents in that case are lactams such as ε-caprolactam, oximes such as methyl ethyl ketoxime or butanone oxime, triazoles such as 1H-1,2,4-triazole, readily enolizable compounds such as acetoacetic esters or acetylacetone, or else malonic acid derivatives such as malonic diesters having 1–10 carbon atoms in the alcohol residues.

EXAMPLES

Having generally described this invention, a further understanding can be obtained by reference to certain specific examples which are provided herein for purposes of illustration only and are not intended to be limiting unless otherwise specified.

A. Preparation of the Catalysts

All reactions are carried out under an inert gas atmosphere, preferably under nitrogen.

A.1. Preparation of N-(2-hydroxypropyl)-N,N-dimethyl-N-(3-methoxybenzyl)ammonium 2-ethylhexanoate (Cat. 1)

A three-necked flask with Claisen attachment, reflux condenser, internal thermometer, mechanical stirrer attachment, dropping funnel, gas inlet and gas outlet is charged with 3-methoxybenzyldimethylamine (1 mol), which is admixed at room temperature with propylene oxide (1 mol; conditioned to about 0° C.), with stirring. Subsequently, 2-ethylhexanoic acid (1 mol) is metered in at a rate such that the temperature of the reaction solution does not exceed 35° C. When addition is complete, stirring is continued at room temperature. The catalyst attains its full activity after about 2 to 3 days.

A.2. Preparation of N-(2-hydroxybutyl)-N,N-dimethyl-N-(3-methoxybenzyl)ammonium 2-ethylhexanoate (Cat. 2)

A three-necked flask with Claisen attachment, reflux condenser, internal thermometer, mechanical stirrer attachment, dropping funnel, gas inlet and gas outlet is charged with 3-methoxybenzyldimethylamine (1 mol) which is admixed at 40° C. with 1,2-butene oxide (1 mol), with stirring. Subsequently, 2-ethylhexanoic acid (1 mol) is metered in at a rate such that the temperature of the reaction solution does not exceed 50° C. When addition is complete, stirring is continued at room temperature. The catalyst attains its full activity after about 2 days.

A.3. Preparation of N-(2-hydroxybutyl)-N,N-dimethyl-N-(3-methoxybenzyl)ammonium pivalate (Cat. 3)

The catalyst is prepared as for Cat. 2 (A.2.). Pivalic acid is used instead of 2-ethylhexanoate. The catalyst obtains its full activity after about 2 days.

A.4. Preparation of N-(2-hydroxypropyl)-N,N-dimethyl-N-(3,4-dimethoxybenzyl)ammonium 2-ethylhexanoate (Cat. 4)

The catalyst is prepared as for Cat. 1 (A.1.). 3,4-dimethoxybenzyldimethylamine is used instead of 3-methoxybenzyldimethylamine. The catalyst obtains its full activity after about 2 to 3 days.

A.5. Preparation of N-(2-hydroxypropyl)-N,N-dimethyl-N-(3,4-dimethoxybenzyl)ammonium formate (Cat. 5)

A three-necked flask with Claisen attachment, reflux condenser, internal thermometer, mechanical stirrer attachment, dropping funnel, gas inlet and gas outlet is charged with 3,4-dimethoxybenzyldimethylamine (1 mol) which is admixed at room temperature with propylene oxide (1 mol; conditioned to about 0° C.), with stirring. Subsequently, formic acid (1 mol) is metered in at a rate such that the temperature of the reaction solution does not exceed 35° C. When addition is complete, stirring is continued at room temperature. The catalyst attains its full activity after about 2 to 3 days.

A.6. Preparation of N-(2-hydroxybutyl)-N,N-dimethyl-N-(3,4-dimethoxybenzyl)ammonium 2-ethylhexanoate (Cat. 6)

In a three-necked flask with Claisen attachment, reflux condenser, internal thermometer, mechanical stirrer attachment, dropping funnel, as well as gas inlet and gas outlet 3,4-dimethoxybenzyldimethylamine (1 mol) is admixed at 40° C. with 1,2-butene oxide (1 mol), with stirring. Subsequently, 2-ethylhexanoic acid (1 mol) is metered in at a rate such that the temperature of the reaction solution does not exceed 50° C. When addition is complete, stirring is continued at room temperature. The catalyst attains its full activity after about 2 days.

A.7. Preparation of N-(2-hydroxyhexyl)-N,N-dimethyl-N-(3,4-dimethoxybenzyl)ammonium 2-ethylhexanoate (Cat. 7)

The catalyst is prepared as for Cat. 6 (A.6.). 1,2-hexene oxide is used instead of 1,2-butene oxide. The catalyst obtains its full activity after about 2 days.

A.8. Preparation of N-(2-hydroxyhexyl)-N,N-dimethyl-N-(3,4-dimethoxybenzyl)ammonium hexanoate (Cat. 8)

In a three-necked flask with Claisen attachment, reflux condenser, internal thermometer, mechanical stirrer attachment, dropping funnel, as well as gas inlet and gas outlet 3-methoxybenzyldimethylamine (1 mol) is admixed at 40° C. with 1,2-hexene oxide (1 mol), with stirring. Subsequently, hexanoic acid (1 mol) is metered in at a rate such that the temperature of the reaction solution does not exceed 50° C. When addition is complete, stirring is continued at room temperature. The catalyst attains its full activity after about 2 days.

A.9. Preparation of N-(2-hydroxybutyl)-N,N-dimethyl-N-(3-methylbenzyl)ammonium 2-ethylhexanoate (Cat. 9)

The catalyst is prepared as for Cat. 2 (A.2.). 3-methylbenzyldimethylamine is used instead of 3-methoxybenzyldimethylamine. The catalyst attains its full activity after about 2 days.

A.10. Preparation of N-(2-hydroxybutyl)-N,N-dimethyl-N-(2-methoxybenzyl)ammonium 2-ethylhexanoate (Cat. 10)

The catalyst is prepared as for Cat. 2 (A.2.). 2-methoxybenzyldimethylamine is used instead of 3-methoxybenzyldimethylamine. The catalyst attains its full activity after about 2 days.

Extractive purification of the catalysts with hexane (5×100 ml) is possible but in general has no significantly positive effect on the color quality of the monomer-freed polyisocyanates.

B. Trimerization Experiments: Examples 1–20 and comparative Examples 1–5

B.1. Trimerization of the Isocyanates

Catalyst and (cyclo)aliphatic diisocyanate are introduced into the reactor at room temperature. The temperature of the mechanically stirred reaction mixture, which is maintained under an inert gas atmosphere ($N_2$), is raised continuously over the course of from 10 to 12 min to the start temperature (about 70° C.). Following initiation of the exothermic trimerization reaction, the heat source is removed. The temperature of the reaction mixture passes through a maximum and falls off again following the thermal deactivation of the catalyst, which takes place in the course of the reaction. The reaction mixture is cooled to room temperature and the excess monomer is separated off from the polyisocyanate by flash evaporation.

The comparison catalysts used were N-(2-hydroxypropyl)-N,N,N-trimethylammonium 2-ethylhexanoate (C-Cat. 1), N-(2-hydroxypropyl)-N,N,N-trimethylammonium formate (C-Cat. 2), and N-(2-hydroxypropyl)-N,N,N-trimethylammonium hydroxide (C-Cat. 3).

The results of the trimerization experiments are summarized in Table 1 and underscore the performance of the catalysts of the invention in comparison to conventional trimerization catalysts of the choline type. The color numbers can be improved further if the trimerization is conducted continuously. In that case, the superiority of the catalysts of the invention as documented in Table I is retained. In principle, low-chlorine (chlorine content <100 mg/kg) and chlorine-free—prepared, for example, by the urea process (cf. e.g. EP-A-0 355 443)—(cyclo)aliphatic diisocyanates give the best results. Alcohols such as benzyl alcohol or butanol can be used as cocatalysts or to dilute the catalysts of the invention, with no deleterious effect on quality.

TABLE 1

| Entry | Diisocyanate | Catalyst Type | Amount (% by wt.) | NCO content (% by wt.) | Polyisocyanate containing isocyanurate groups Color number (Hazen) | Monomer-freed isocyanurates Color number (Hazen) |
|---|---|---|---|---|---|---|
| Comparative Example | | | | | | |
| 1 | IPDI | C-Cat.1 | 0.20 | 30.2 | 105 | 131[1] |
| 2 | HDI | C-Cat.1 | 0.10 | 35.4 | 97 | 176 |
| 3 | MPDI | C-Cat.1 | 0.10 | 36.4 | 108 | 201 |
| 4 | IPDI | C-Cat.2 | 0.20 | 29.9 | 178 | 212[1] |
| 5 | IPDI | C-Cat.3 | 0.20 | 29.4 | 98 | 131[1] |
| Example | | | | | | |
| 1 | IPDI | Cat.1 | 0.25 | 30.4 | 43 | 61[1] |
| 2 | HDI | Cat.1 | 0.10 | 38.8 | 23 | 49 |
| 3 | IPDI | Cat.2 | 0.25 | 30.5 | 42 | 62[1] |
| 4 | HDI | Cat.2 | 0.10 | 38.8 | 26 | 49 |
| 5 | MPDI | Cat.2 | 0.10 | 39.8 | 29 | 56 |
| 6 | IPDI | Cat.3 | 0.25 | 30.5 | 47 | 71[1] |
| 7 | HDI | Cat.3 | 0.10 | 38.9 | 30 | 54 |
| 8 | IPDI | Cat.4 | 0.19 | 30.9 | 37 | 52[1] |
| 9 | HDI | Cat.4 | 0.10 | 38.7 | 27 | 98[1] |
| 10 | IPDI | Cat.5 | 0.19 | 31.0 | 61 | 91 |
| 11 | HDI | Cat.5 | 0.10 | 39.1 | 38 | 50[1] |
| 12 | IPDI | Cat.6 | 0.19 | 30.9 | 36 | 50 |
| 13 | HDI | Cat.6 | 0.10 | 38.8 | 28 | 50 |
| 14 | IPDI | Cat.7 | 0.19 | 30.8 | 32 | 45[1] |
| 15 | HDI | Cat.7 | 0.10 | 38.7 | 22 | 43 |
| 16 | MPDI | Cat.7 | 0.10 | 39.9 | 19 | 41 |
| 17 | IPDI | Cat.8 | 0.19 | 30.7 | 33 | 47[1] |
| 18 | HDI | Cat.8 | 0.10 | 38.9 | 21 | 40 |
| 19 | IPDI | Cat.9 | 0.35 | 30.4 | 42 | 60[1] |
| 20 | HDI | Cat.9 | 0.10 | 38.9 | 25 | 49 |
| 21 | IPDI | Cat.10 | 0.25 | 30.4 | 40 | 57[1] |
| 22 | HDI | Cat.10 | 0.10 | 38.8 | 28 | 52 |
| 23 | IPDI | Cat.2[2] | 0.25 | 30.4 | 44 | 63[1] |
| 24 | IPDI[3] | Cat.2 | 0.25 | 30.6 | 27 | 35[1] |
| 25 | IPDI | Cat.7[2] | 0.19 | 30.7 | 32 | 46[1] |
| 26 | IDPI[4] | Cat.7 | 0.19 | 30.8 | 28 | 39[1] |

[1] 50% strength solution of butyl acetate;
[2] Cat.2 as a 90% strength in benzyl alcohol;
[3] IPDI with chlorine content <100 ppm;
[4] chlorine-free IPDI (prepared by the urea process).

Obviously, numerous modifications and variations of the present invention are possible in light of the above teachings. It is therefore to be understood that within the scope of the appended claims, the invention may be practiced otherwise than as specifically described herein.

The entire contents of each of the abovementioned references, patents and published applications is hereby incorporated by reference, the same as if set forth at length.

This application is based on German patent application 19944373.4, filed Sep. 16, 1999, and incorporated herein by reference in its entirety.

What is claimed is:

1. A trimerization catalyst of the formula (I):

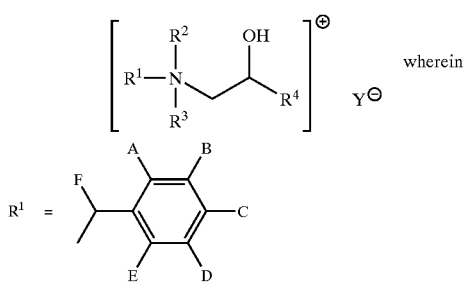

(I)

wherein and where the variables are defined as follows:

A, B, C, D and E independently of one another or simultaneously are hydrogen, chloro, $C_1$–$C_4$ alkyl, $C_1$–$C_4$ alkoxy, $C_1$–$C_4$ alkoxycarbonyl, hydroxyl, $(R^5)_3$SiO—, $(R^5)_2$N—, —COOH, $(R^5)_2$N—$CH_2$— or phenyl, it being possible for any two adjacent radicals selected from the group consisting of A, B, C, D and E radicals to form a conjoint 5- or 6-membered saturated or unsaturated ring which may optionally and additionally include N, S or O as a heteroatom;

F is hydrogen or methyl;

$R^2$ and $R^3$ independently of one another or simultaneously are $C_1$–$C_4$ alkyl, $C_2$–$C_6$ hydroxyalkyl with a hydroxyl group in position 2 relative to the quaternary nitrogen in formula (I), or $R^1$; $R^4$ is hydrogen, methyl, $C_2$–$C_{10}$ alkyl, $C_3$–$C_8$ cycloalkyl or $C_2$–$C_{12}$ alkoxy;

$R^5$ is $C_1$–$C_4$ alkyl;

Y is $R^6COO$ or OH; and $R^6$ is hydrogen or a branched or unbranched, aliphatic or araliphatic, $C_1$–$C_{10}$ alkyl radical.

2. A trimerization catalyst of the formula (I):

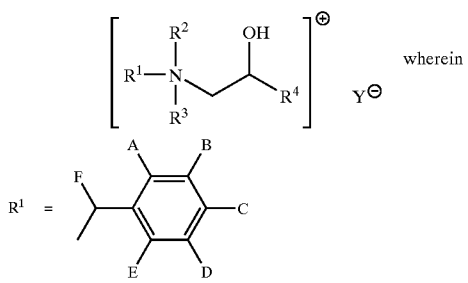

(I)

wherein and where the variables are defined as follows:

A, B, C, D and E independently of one another or simultaneously are hydrogen, chloro, $C_1$–$C_4$ alkyl, $C_1$–$C_4$ alkoxy, $C_1$–$C_4$ alkoxycarbonyl, hydroxyl, $(R^5)_3$SiO—, $(R^5)_2$N—, —COOH, $(R^5)_2$N—$CH_2$— or phenyl, it being possible for any two adjacent radicals selected from the group consisting of A, B, C, D and E radicals to form a conjoint 5- or 6-membered saturated or unsaturated ring which may optionally and additionally include N, S or O as a heteroatom;

F is hydrogen or methyl;

$R^2$ and $R^3$ independently of one another or simultaneously are $C_1$–$C_4$ alkyl, $C_2$–$C_6$ hydroxyalkyl with a hydroxyl group in position 2 relative to the quaternary nitrogen in formula (I), or $R^4$ is hydrogen, methyl, $C_2$–$C_{10}$ alkyl, $C_3$–$C_8$ cycloalkyl or $C_2$–$C_{12}$ alkoxy, $R^5$ is $C_1$–$C_4$ alkyl;

Y is $R^6COO$; and $R^6$ is hydrogen or a branched or unbranched, aliphatic or araliphatic, $C_1$–$C_{10}$ alkyl radical.

3. A trimerization catalyst of the formula (I):

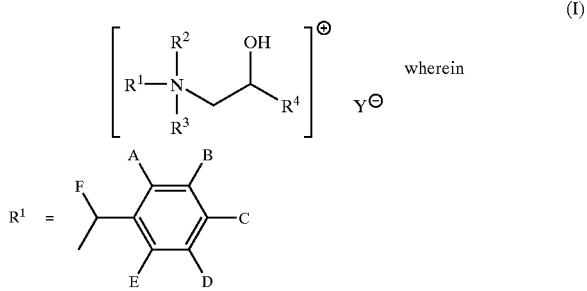

(I)

wherein and where the variables are defined as follows:

A, B, C, D and E independently of one another or simultaneously are hydrogen, chloro, $C_1$–$C_4$ alkyl, $C_1$–$C_4$ alkoxy, $C_1$–$C_4$ alkoxycarbonyl, hydroxyl or phenyl;

F is hydrogen or methyl;

$R^2$ and $R^3$ independently of one another or simultaneously are $C_1$–$C_4$ alkyl, $C_2$–$C_6$ hydroxyalkyl with a hydroxyl group in position 2 relative to the quaternary nitrogen in formula (I), or $R^4$ is hydrogen, methyl, $C_2$–$C_{10}$ alkyl, $C_3$–$C_8$ cycloalkyl or $C_2$–$C_{12}$ alkoxy;

$R^5$ is $C_1$–$C_4$ alkyl;

Y is $R^6COO^-$ or $OH^-$; and $R^6$ is hydrogen or a branched or unbranched, aliphatic or araliphatic, $C_1$–$C_{10}$ alkyl radical.

4. The catalyst as claimed in claim 3, N-(2-hydroxypropyl)-N,N-dimethyl-N-(3-methoxybenzyl)ammonium 2-ethylhexanoate.

5. The catalyst as claimed in claim 3, N-(2-hydroxybutyl)-N,N-dimethyl-N-(3-methoxybenzyl)ammonium 2-ethylhexanoate.

6. The catalyst as claimed in claim 3, N-(2-hydroxybutyl)-N,N-dimethyl-N-(3-methoxybenzyl)ammonium pivalate.

7. The catalyst as claimed in claim 3, N-(2-hydroxypropyl)-N,N-dimethyl-N-(3,4-dimethoxybenzyl)ammonium 2-ethylhexanoate.

8. The catalyst as claimed in claim 3, N-(2-hydroxypropyl)-N,N-dimethyl-N-(3,4-methoxybenzyl)ammonium formate.

9. The catalyst as claimed in claim 3, N-(2-hydroxyhexyl)-N,N-dimethyl-N-(3,4-methoxybenzyl)ammonium 2-ethylhexanoate.

10. The catalyst as claimed in claim 3, N-(2-hydroxyhexyl)-N,N-dimethyl-N-(3,4-dimethoxybenzyl)ammonium 2-ethylhexanoate.

11. The catalyst as claimed in claim 3, N-(2-hydroxyhexyl)-N,N-dimethyl-N-(3,4-dimethoxybenzyl)ammonium hexanoate.

12. The catalyst as claimed in claim 3, N-(2-hydroxybutyl)-N,N-dimethyl-N-(3-methylbenzyl)ammonium 2-ethylhexanoate.

13. The catalyst as claimed in claim 3, N-(2-hydroxybutyl)-N,N-dimethyl-N-(2-methoxybenzyl)ammonium 2-ethylhexanoate.

14. A trimerization catalyst of the formula (I):

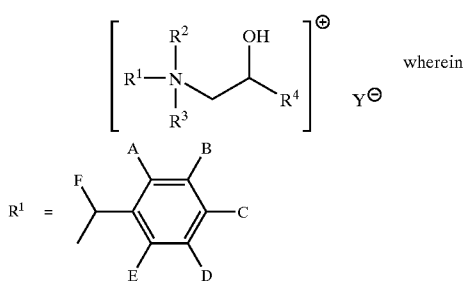

and where the variables are defined as follows:
A, B, C, D and E independently of one another or simultaneously are hydrogen, chloro, $C_1$–$C_4$ alkyl, $C_1$–$C_4$ alkoxy, $C_1$–$C_4$ alkoxycarbonyl, hydroxyl, $(R^5)_3$SiO—, $(R^5)_2$N—, —COOH, $(R^5)_2$N—$CH_2$— or phenyl, F is hydrogen or methyll $R^2$ and $R^3$ independently of one another or simultaneously are $C_1$–$C_4$ alkyl, $C_1$–$C_6$ hydroxyalkyl with a hydroxyl group in position 2 relative to the quaternary nitrogen in formula (I), or $R^1$;

$R^4$ is hydrogen, methyl, $C_2$–$C_{10}$ alkyl, $C_3$–$C_8$ cycloalkyl or $C_2$–$C_{12}$ alkoxy;

$R^5$ is $C_1$–$C_4$ alkyl;

Y is $R^6COO^-$ or $OH^-$; and $R^6$ s hydrogen or a branched or unbranched, aliphatic or araliphatic, $C_1$–$C_{10}$ alkyl radical.

15. The catalyst as claimed in claim 3, which is selected from the group consisting of N-(2-hydroxypropyl)-N,N-dimethyl-N-(3-methoxybenzyl)ammonium 2-ethylhexanoate;

N-(2-hydroxybutyl)-N,N-dimethyl-N-(3-methoxybenzyl)ammonium 2-ethylhexanoate;

N-(2-hydroxybutyl)-N,N-dimethyl-N-(3-methoxybenzyl)ammonium pivalate;

N-(2-hydroxypropyl)-N,N-dimethyl-N-(3,4-dimethoxybenzyl)ammonium 2-ethylhexanoate;

N-(2-hydroxypropyl)-N,N-dimethyl-N-(3,4-dimethoxybenzyl)ammonium formate;

N-(2-hydroxybutyl)-N,N-dimethyl-N-(3,4-dimethoxybenzyl)ammonium 2-ethylhexanoate;

N-(2-hydroxyhexyl)-N,N-dimethyl-N-(3,4-dimethoxybenzyl)ammonium 2-ethylhexanoate;

N-(2-hydroxyhexyl)-N,N-dimethyl-N-(3,4-dimethoxybenzyl)ammonium hexanoate;

N-(2-hydroxybutyl)-N,N-dimethyl-N-(3-methylbenzyl)ammonium 2-ethylhexanoate; and N-(2-hydxoxybutyl)-N,N-dimethyl-N-(2-methoxybenzyl)ammonium 2-ethylhexanoate.

* * * * *